United States Patent [19]

Kameda et al.

[11] Patent Number: 5,790,322
[45] Date of Patent: Aug. 4, 1998

[54] OPTICAL SYSTEM AND APPARATUS FOR MAGNIFYING A DISPLAY PANEL

[75] Inventors: Tsuyoshi Kameda, Omiya; Motosuke Kiyohara; Eiichi Takano, both of Tokyo, all of Japan

[73] Assignee: Kansei Corporation, Saitama-ken, Japan

[21] Appl. No.: 467,478

[22] Filed: Jun. 7, 1995

Related U.S. Application Data

[62] Division of Ser. No. 936,396, Aug. 31, 1992, abandoned.

[30] Foreign Application Priority Data

| Aug. 30, 1991 | [JP] | Japan | 3-069454 |
| Aug. 30, 1991 | [JP] | Japan | 3-069455 |
| Oct. 14, 1991 | [JP] | Japan | 3-083051 |
| Jun. 15, 1992 | [JP] | Japan | 4-155411 |

[51] Int. Cl.⁶ .................. G02B 3/08; G02B 3/02
[52] U.S. Cl. ........................... 359/742; 359/717
[58] Field of Search ..................... 359/742, 717

[56] References Cited

U.S. PATENT DOCUMENTS

| 2,780,136 | 2/1957 | Erban | 359/730 |
| 4,391,495 | 7/1983 | Mazurkewitz | 359/742 |
| 4,542,961 | 9/1985 | Sato | 359/708 |
| 4,620,773 | 11/1986 | Fukuda | 359/708 |
| 4,670,095 | 6/1987 | Negishi | 359/742 |
| 4,767,199 | 8/1988 | Yamamoto et al. | 359/708 |
| 4,771,368 | 9/1988 | Tsukamoto et al. | 362/29 |
| 4,865,419 | 9/1989 | Shepherd | 359/742 |
| 4,936,657 | 6/1990 | Tejima et al. | 359/742 |
| 5,129,269 | 7/1992 | Iizuka et al. | 362/30 |
| 5,268,790 | 12/1993 | Chen | 359/742 |
| 5,583,702 | 12/1996 | Cintra | 359/742 |

FOREIGN PATENT DOCUMENTS

| 0035320 | 2/1989 | Japan | 116/286 |

*Primary Examiner*—George Y. Epps
*Assistant Examiner*—Evelyn A. Lester
*Attorney, Agent, or Firm*—Evenson, McKeown, Edwards & Lenahan, PLLC

[57] ABSTRACT

An optical system for magnifying a display panel includes a magnifying lens disposed in front of a display panel. The magnifying lens is constructed with two lenses respectively having convex surfaces opposite each other. At least one of the two convex surfaces is aspherical. A transverse aberration of the magnifying lens is less than the diameter of the pupil of an eye at a point where the eye is positioned. The lens for the optical system is a Fresnel lens whose vortex center is located on its edge. An apparatus for magnifying display panels according to the invention includes an instrument to be viewed distantly and instruments to be viewed not distantly. The instrument to be viewed distantly is disposed distant from the Fresnel lens under a center portion of the Fresnel lens, whereas the instruments to be viewed not distantly are disposed close to the Fresnel lens under an edge portion of the Fresnel lens. An apparatus for magnifying display panels according to the invention includes a display panel illuminating light source disposed inside a housing of the instrument and scale markings provided inside the edge of the opening of the housing.

6 Claims, 15 Drawing Sheets

1

OPTICAL SYSTEM AND APPARATUS FOR MAGNIFYING A DISPLAY PANEL

This is a divisional application of Ser. No. 07/936,396 filed on Aug. 31, 1992, now abandoned.

BACKGROUND OF THE INVENTION

1. Field of the Invention

The invention relates to an optical system and apparatus for magnifying a display panel of an instrument, black-faced meter or the like provided for a vehicle such as an automobile, more particularly to a magnifying optical system and apparatus suitable for displaying such a display panel for viewing distantly from a driver's seat.

2. Description of the Prior Art

Various indicating meters or instruments are usually mounted on a dashboard in a vehicle, for example. However, the dashboard is relatively near to a viewpoint of a driver of the vehicle, and therefore the driver's eyes must make a large shift when the eyes are turned from a far forward spot to the instruments on the dashboard when driving. In other words, the instruments are hard to view while the vehicle is running at a high speed and it seems that this difficulty often incurs a danger. To avoid such a danger, an apparatus for magnifying a display panel has been developed wherein a magnifying lens is disposed in front of the display panels of the instruments mounted on the dashboard and the display panels are looked at through the lens by illuminating them. According to this magnifying apparatus, a virtual image of the display panel is formed by the lens so that the virtual image is located farther than in fact, and hence the aforementioned deficiency is expected to be removed by the apparatus.

As a magnifying optical device, a convex lens called "Lupe" and a Fresnel lens are known. To see an object magnified with such a magnifying lens, one eye may be brought close to the lens. However, it is impossible to bring the eye close to the lens for magnifying the instruments owing to a given distance between the driver's seat and the dashboard containing the instruments. Also, the instruments are usually viewed with both eyes. Further, a visual axis of the eye does not always coincide with an optical axis of the lens. In other words, those display panels are occasionally viewed at an angle. Due to these circumstances, a conventional magnifying optical system for a display panel still has a problem such as that the display panel is optically distorted or one portion of the display panel cannot be viewed clearly although the other portion thereof can be viewed clearly.

Further, as shown in FIG. 19, for example, is an instrument unit provided for an automobile. This unit has a main instrument 70 for indicating speed of the automobile and its engine speed and sub-instruments 71 for indicating liquid temperature and fuel reserve. The main and sub-instruments 70, 71 are together disposed in an instrument frame 72, and display panels 74, 75 are illuminated by an illuminating light source 73 disposed in the same instrument frame 72. The instrument unit including the main and sub-instruments is hereinafter referred as a multiple instrument 76. The display panel of the multiple instrument 76 is larger in area than that of the single instrument. Reference numeral 77 designates a display surface 77 including the display panels 74, 75. To display the whole wide display panel of the multiple instrument 76 more distantly than in fact with a lens, there is required a magnifying apparatus including one or more lenses (e.g. Fresnel lens) an area of which is larger than that of the display surface 77 of the multiple instrument 76, as shown in FIG. 20. However, a large lens generally has a large quantity of aberration. In particular, such a large lens has a problem that the virtual image of a display panel is distorted at the edge of the lens and hence it is hard to view it clearly.

Also, there is known an instrument for an automobile wherein illuminating light sources 73 for illuminating the display panel are arranged as shown in FIG. 21. Referring to FIG. 21, reference numeral 79 designates a cylindrical housing containing a movement 80. At a side of the housing 79 is installed a printed base plate 81, and at the other side thereof is installed a transparent (colored-transparent or half-transparent) dial plate 82. For the back of the dial plate 82 is provided a light-guiding plate 83, and for the front thereof are provided scale markings 84. Toward the light-guiding plate 83 is directed the light sources 73 which are placed outside the housing 79. The scale markings 84 are illuminated through the light-guiding plate 83 by the light source 73. Reference numerals 85 and 86 designate a shaft or a pivot projecting from the movement 80 and an indicator needle supported by the pivot, respectively. It is considered that the actual area of the display panel must be decreased according to its magnification, if a display panel of an instrument is magnified to be viewed in appearance at a distance. Also, to avoid an interference of the instruments with other apparatuses mounted on the same dashboard, it is preferable to make the instrument itself small.

If the scale markings 84 are displaced to the positions as shown by the broken line 84' and the indicator needle 86 is shortened as in the broken line, the display panel itself can be made small. However, in this case, the instrument for an automobile as shown in FIG. 21 has a disadvantage that the scale markings 84' cannot be efficiently illuminated owing to obstruction by the housing 79 to illuminating light rays emitted from the light sources 73. This disadvantage results from providing the light sources 73 and the light-guiding means 83 each outside the housing 79.

SUMMARY OF THE INVENTION

A first object of the invention is to provide a magnifying optical system and apparatus able to view an image of a display panel magnified therewith almost without any distortion of the image.

A second object of the invention is to provide a display panel magnifying apparatus able to be made smaller in size than a conventional apparatus while providing a clear image of the display panel.

To achieve the first object, an optical system for magnifying a display panel with a magnifying lens disposed in front of the display panel according to the invention is characterized in that the magnifying lens has a transverse aberration smaller than the diameter of the pupil of an eye at a point where the eye is positioned.

According to a display panel magnifying optical system of the invention, the whole display panel is almost able to be viewed through a lens. Also, according to the optical system of the invention, the distortion of the image of the display panel is almost prevented when the display panel is magnified.

Preferably, the magnifying optical system of the invention is characterized in that the magnifying lens is made of two Fresnel lenses and the vortex center of the Fresnel lens is placed at the edge or the outside of the lens. According to the magnifying lens, the driver can view the display panel clearly without worrying about the position of the vortex center.

3

To achieve the first object of the invention, a display panel magnifying apparatus of the invention is characterized in that instruments desired to be viewed at a distance and instruments desired to be not viewed at a distance are provided therein, and the display panels of the instruments to be viewed distantly are disposed distant from a magnifying lens under the middle of the lens whereas the display panels of the instruments to be not viewed distantly are disposed close to the magnifying lens under the edge portion of the lens to view the display panels through the lens.

To achieve the second object of the invention, a display panel magnifying apparatus of the invention is characterized by a movement disposed within a housing, a light source disposed around the movement, and a dial plate fixed to the portion of the opening of the housing, the dial plate being provided with scale markings marked within the opening.

By this arrangement, it is possible to make the apparatus small without lowering the display quality since the scale markings are illuminated from the inside of the housing.

Other objects of the invention are shown by the description below.

4

Figure 17:
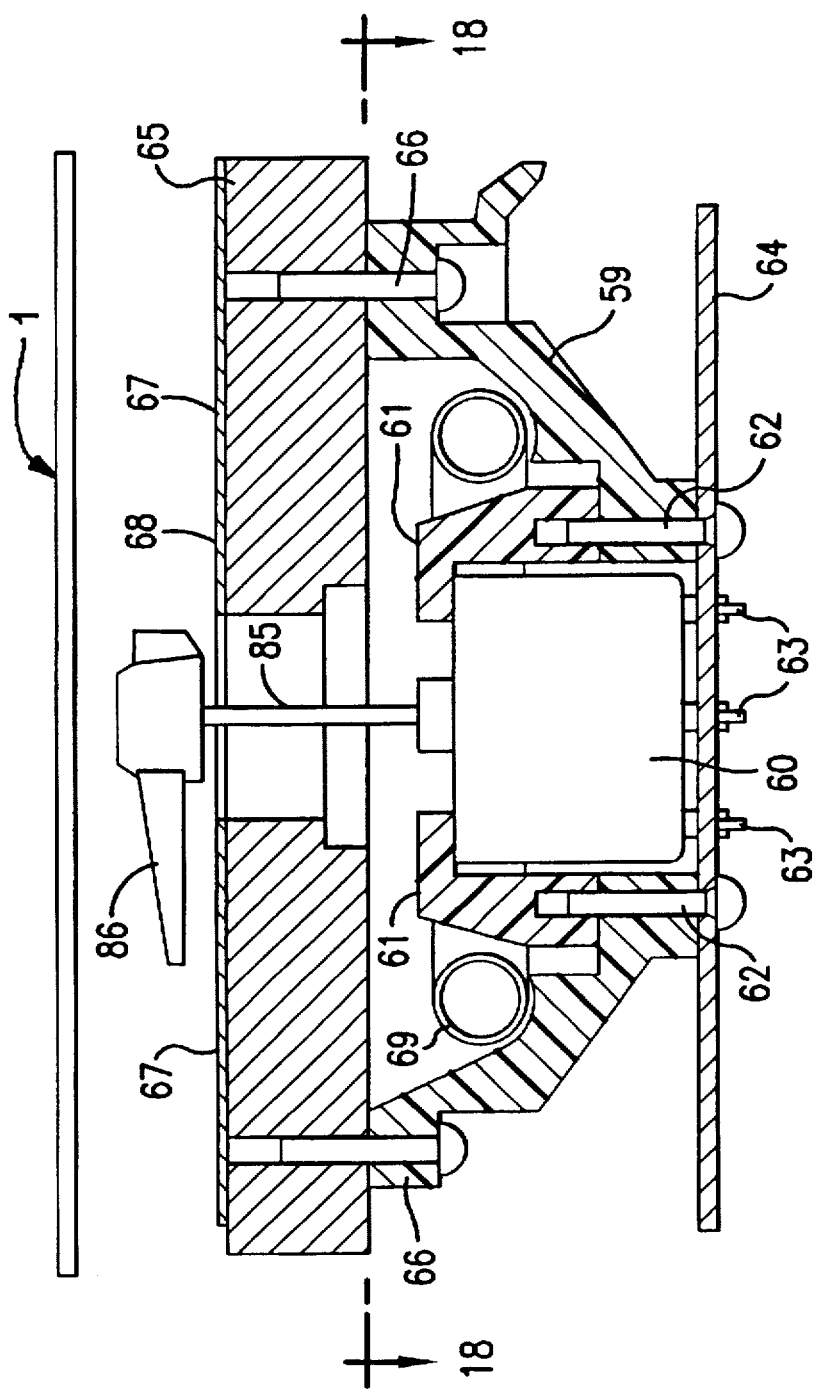
Figure 18:
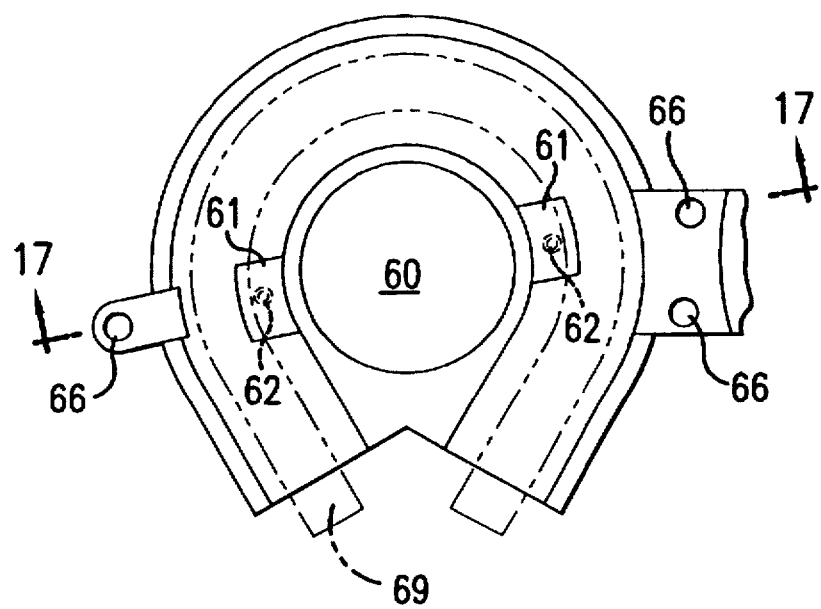

FIG. 17 is a sectional view taken substantially along the line 17—17 of FIG. 18, showing an apparatus for magnifying a display panel according to a second embodiment of the invention.

FIG. 18 is a sectional view taken substantially along the line —18 of FIG. 17.

Figure 19:
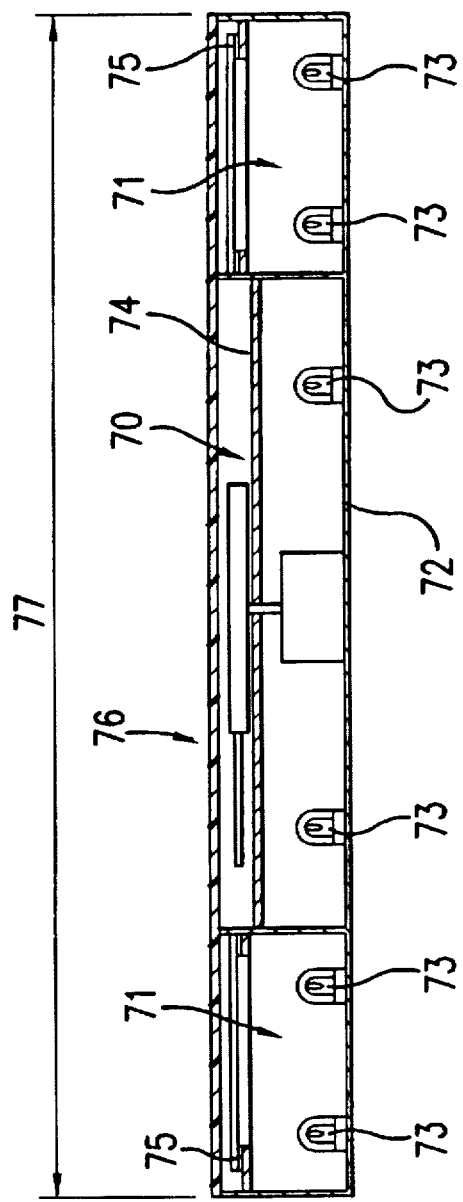

FIG. 19 is a view showing a conventional arrangement of instruments for an automobile.

Figure 20:
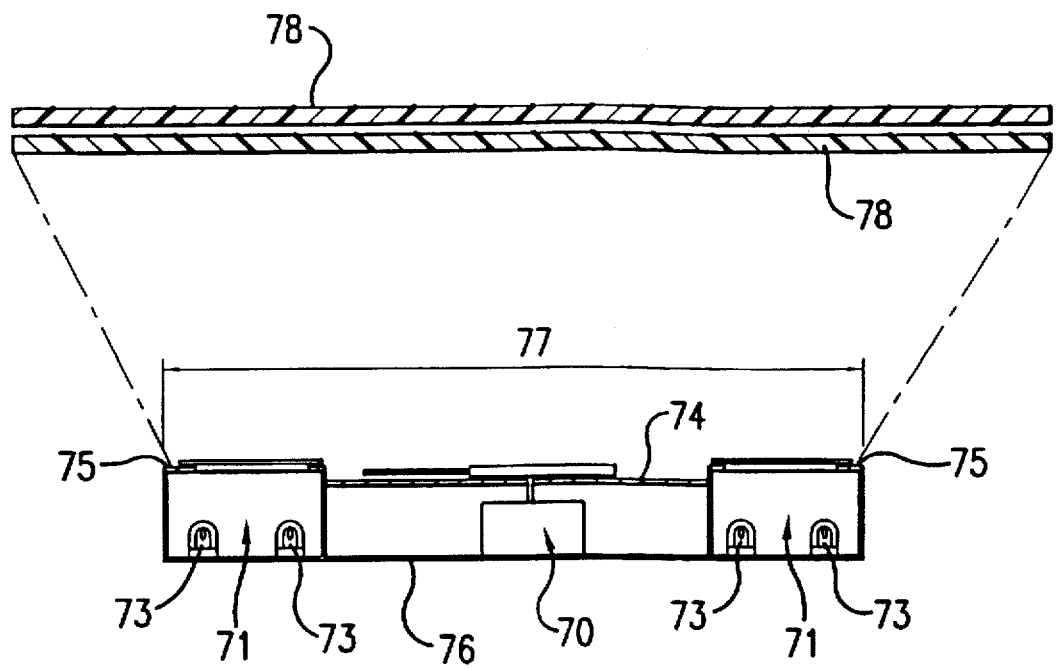

FIG. 20 is a view showing a construction of a conventional apparatus for magnifying a display panel.

Figure 21:
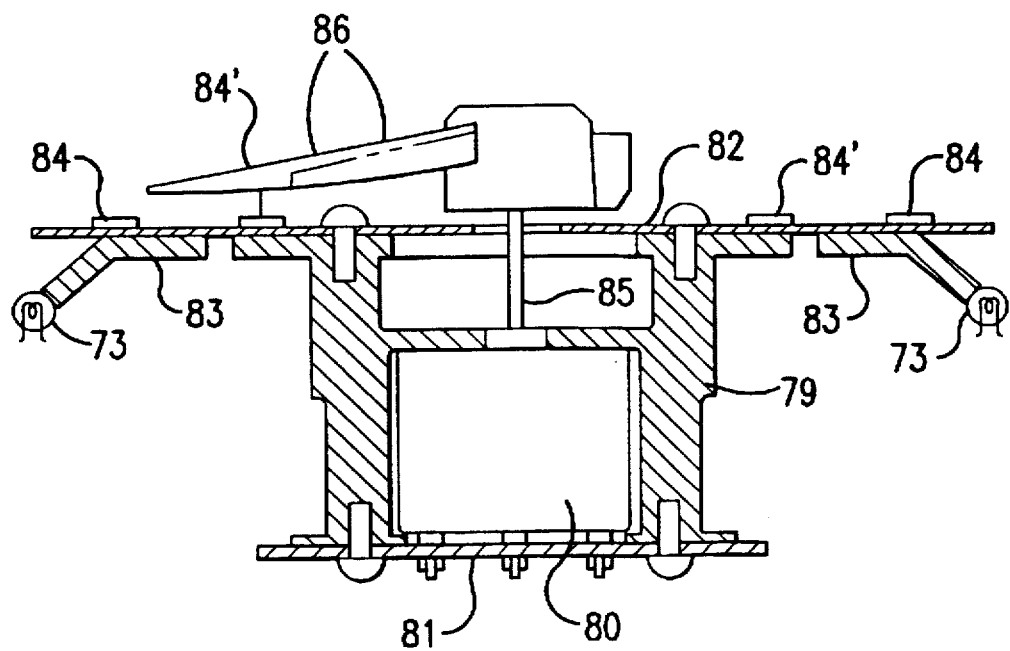

FIG. 21 is a sectional view showing a conventional arrangement of light sources.

DESCRIPTION OF THE PREFERRED EMBODIMENTS

FIGS. 1 to 9 show an optical system for magnifying a display panel according to a first embodiment of the invention.

Figure 1:
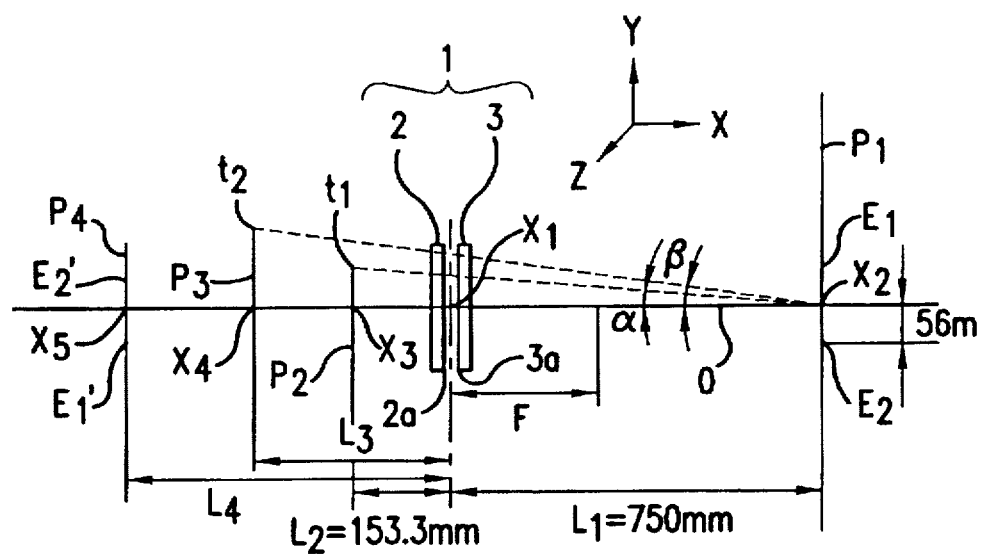
FIG. 1 is a diagrammatic view showing an optical system for magnifying a display panel according to a first example of the present invention.
Figure 2:
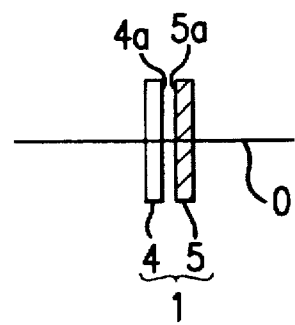
FIG. 2 is a view showing lenses used in an optical system for magnifying a display panel according to a second example of the present invention.

Referring to FIG. 1, a lens 1 for magnifying a display panel is disposed at a point X1. The lens 1 consists of two Fresnel lenses 2, 8 convex surfaces $2a$, $3a$ of which are opposite each other. As shown in FIG. 2, the lens 1 may consist of a spherical lens 4 and a Fresnel lens 5 convex surfaces $4a$, $5a$ of which are opposite each other.

Reference character O designates an optical axis of the optical system, $P_1$ designates a plane perpendicular to the axis O, and $X_2$ designates an intersection of the axis O with the plane $P_1$ on which eyes $E_1$, $E_2$ are positioned. The eyes $E_1$, $E_2$ exist within a radius of 55 mm from $X_2$. Reference character $L_1$ designates a distance between $X_1$ and $X_2$, being determined 750 mm on account of a distance between a dashboard in an automobile and a driver sitting in a driver's seat. $P_2$ designates a surface of a display panel of an instrument perpendicular to the optical axis O, $X_3$ designates an intersection of the axis O with the plane $P_2$. A distance $L_2$ between $X_1$ and $X_3$ is determined 153.3 mm. The display panel has a diameter of 158 mm (a radius of 79 mm) at its maximum.

The display panel is magnified 1.7 times with the lens 1. Here, a magnification is defined as a ratio $\alpha/\beta$ of an optic angle a to an optic angle $\beta$. The optic angle $\alpha$ is formed by a line of $t_1$-$X_2$ and the axis O when seeing the edge or side $t_1$ of the display panel $P_2$ without the lens 1. The optic angle $\beta$ is formed by a line of $t_2$-$X_2$ and the axis O when seeing the edge or side $t_2$ of an enlarged image of the display panel $P_2$ (that is, a virtual image of the same) with the lens 1. The focal length F of the lens 1 can be determined according to a magnification $\alpha/\beta$. Detailed values of the focal length F are shown in the embodiment as described later. A virtual image $P_3$ of the plane of the display panel $P_2$ is positioned at $X_4$ distant by $L_3$ (=306.2 mm) from $X_1$. $P_4$ designates a conjugate image of the plane $P_1$, and $X_5$ designates a point where the conjugate image $P_4$ is formed. A distance $L_4$ between $X_1$ and $X_5$ is 518.8 mm. Real images of the eyes $E_1$ and $E_2$ formed on the plane of the conjugate image $P_4$ are referred as $E_1'$ and $E_2'$, respectively.

When the middle of the width $E_1$-$E_2$ coincides with $X_2$, the middle EI of the width $E_1'$-$E_2'$ coincides with $X_5$.

Figure 3:
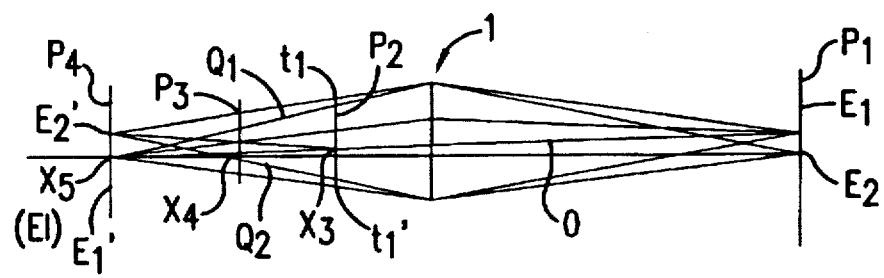
FIG. 3 is an optical view showing image formation of light rays, illustrating conditions for viewing instruments without any distortion.
Figure 4:
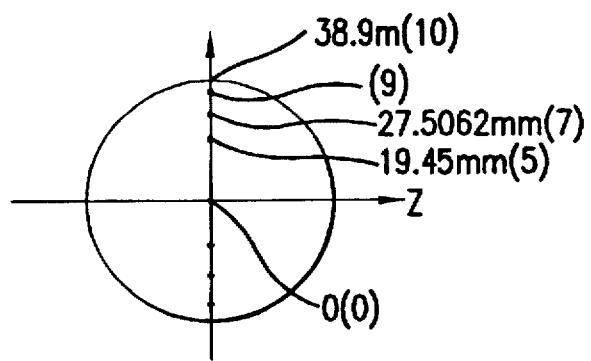
FIG. 4 is a view showing positions of light rays with respect to an optical axis, illustrating a ray tracing result.

In order to view the instrument without distortion, as shown in FIG. 3, light rays which are emitted from $X_5$ and have passed through a whole circular area containing the instrument must be introduced into a pupil of each eye. The contractile opening of the pupil usually varies 3 to 6 mm in diameter. When a light ray $Q_1$ which has passed the upper edge $t_1$ of the plane $P_2$ of the instrument is introduced into the eyes whereas a light ray $Q_2$ which has passed the lower edge $t_1'$ is not introduced into the eyes, the instrument is optically distorted since these two points (two edges) $t_1$ and $t_1'$ cannot be viewed at the same time. When the middle between the eyes $E_1$, $E_2$ is moved on the plane $P_1$ perpendicular to the axis O, the center EI of the image side corresponding to the middle between $E_1$ and $E_2$ is considered as a point source. After light rays emitted from the point source pass through the whole circular area containing the instrument, all the rays must enter into the eyes $E_1$, $E_2$ to view it without distortion. Here, the size of the lens 1 depending on conditions for image formation relative to the pupil is 75 mm in radius. Referring to FIG. 4, four object points are defined as follows: one is a point where the center EI of the real images $E_1'$ and $E_2'$ is positioned on the axis O, being referred as O-point; another is a point where the center EI is positioned farthest from the axis O in the Y direction or Z direction, 38.9 mm distant from the axis O, the point being conjugate with the middle between $E_1$ and $E_2$ 55 mm distant from the axis O; still another is a point where the center EI is positioned 27. 5062 mm distant from the axis O, equivalent to $1/\sqrt{2}$ of the radius of 38.9 mm (=38.9 mm/$\sqrt{2}$); and still another is a point where the center EI is positioned 19.45 mm distant from the axis O, equivalent to a half of the radius of 38.9 mm. Each numeral in parentheses in FIG. 4 designates a standardized value.

The plane $P_2$ of the display panel having a radius of 75 mm is considered as an entrance pupil. On this supposition, it is examined whether a longitudinal spherical aberration of a light ray passing through each point equivalent to 90% of the entrance pupil, $1/\sqrt{2}$ thereof, and 50% thereof is included in the pupil of the eye when the center EI is positioned on the optical axis O. On the other hand, when the center EI is positioned out of the axis O, the center EI is considered as an object point and a light ray passing through both the object point and the center of the lens 1 is defined as a principal ray. On this supposition, it is examined whether a light ray passing through the entrance pupil having a radius of 75 mm and a point equivalent to 75 mm/$\sqrt{2}$ is introduced into the pupils of the eyes $E_1$ and $E_2$. In other words, each aberration at a point of the edge of the display panel, a point equivalent to 70% thereof, a point equivalent to 50% thereof, and a point on the axis O is examined according to a common method for making a lens.

Table 4 shows initial values of an incident ray satisfying the conditions. Referring to Table 4, reference character Y designates the height of an object, YM designates y coordinate of the principal ray on the entrance pupil (y coordinate thereof on the plane $P_2$), YO designates y coordinate of an upper ray (a ray over the axis O) on the entrance pupil (y coordinate on the plane $P_2$), and YU designates y coordinates of a lower ray (a ray under the axis O) on the entrance pupil. The value of YU at the object point was determined [0] for the −79.0 mm in fact. However, since this optical system is rotation symmetry with respect to the axis, the upper and lower rays pass through two points completely symmetrical to each other. Therefore, these rays do not need to be traced and the value of YU at the object point O may be represented zero.

There is now described design values of a lens according to an example of the invention by comparison with design values thereof according to the prior art. When a Fresnel lens is used for a lightweight and thin lens, a ring pitch thereof is determined 0.3 mm. Further, the Fresnel lens is determined aspherical since the aspherical lens is almost same in processing costs to a spherical lens.

(PRIOR ART)

Figure 5:
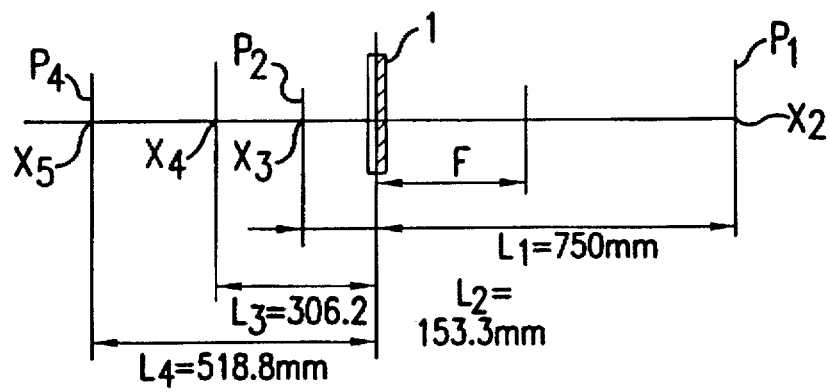
FIG. 5 is a diagrammatic view showing a conventional optical system for magnifying a display panel.

Table 1 shows design data of an optical system for magnifying a display panel as shown in FIG. 5. A lens 1 in FIG. 5 is a Fresnel lens.

Figure 6:
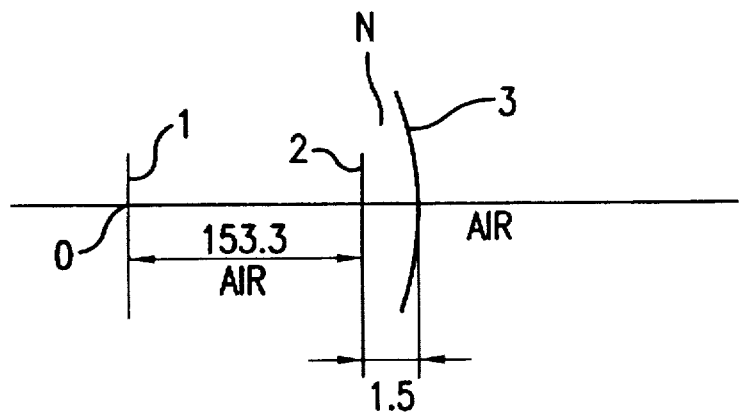
FIG. 6 is a schematically enlarged view of an optical system relative to Table 1.

Reference characters in Table 1 (same in Tables 2 and 3 as described later) designate the following.
NO: plane number
D: distance between planes
ND: refractive index for the lens with respect to a d-ray
NC: refractive index for the lens with respect to a c-ray
NF: refractive index for the lens with respect to a f-ray
R: radius of curvature of a refracting interface
F: front focal length
BF: back focal length
O1: front main point
OK: back main point FIG. 6 is a diagrammatical view showing an optical system according to the design data. Reference numeral 3 designates an aspherical surface.

The aspherical surface is defined by the following known formula:

$$X = \{C \cdot Y^2/[1 + \sqrt{(1-(1+K)C \times 2Y^2)}\,]\} + A_4 Y^4 + A_6 Y^6 + A_8 Y^8 + A_{10} y^{10}$$

where X is a distance from an origin which is the coordinates of the vertex of an aspherical surface on the plane touching to the vertex thereof, Y is a height from the optical axis in the coordinates relative to the aspherical surface, k is a conical constant, c is a curvature at the vertex of the aspherical surface, and $A_4$, $A_6$, $A_8$, and $A_{10}$ are aspherical coefficients of a fourth power, a sixth power, a 8th power, and a tenth power, respectively, all of the aspherical coefficients of them are zero, here.

Table 5 shows a result of ray tracing according to the design data of the conventional optical system for magnifying a display panel.

In Table 5, Y designates the height of an image on the plane $P_1$, DY designates a transverse spherical aberration, SA designates a longitudinal spherical aberration, D-DY designates transverse aberrations of image heights of 55.105 mm, 39.032 mm, and 27.623 mm in which values are the aberrations of rays of heights of the entrance pupils of 10, 7, 0, −7, and −10. Owing to the use of an aspherical lens, rays are asymmetrical with respect to the axis of a meridional plane, and therefore ray tracing is required on the upper and lower sides.

In order to examine accurately by decreasing the number of the examining points as much as possible, the ray tracing is carried out with respect to the principal ray on the supposition that the coordinates of the principal ray on the entrance pupil is an origin and a distance between the origin and the co-ordinates of the upper ray on the entrance pupil has an amount of 100%. And a ray passing through a point equivalent to 70% thereof was traced. The ray tracing is carried out on the lower side the same as in the upper side. Table 5 teaches the following. That is, according to the design data of the conventional optical system for magnifying a display panel as shown in Table 1, rays emitted from $X_5$ are considered to be sufficiently introduced into the pupils of the eyes owing to a transverse spherical aberration of 0.34 mm when the middle of the eyes $E_1$, $E_2$ coincides with the optical axis. However, the transverse aberration D-DY out of the axis is 11.96 mm at its maximum at the point where the center EI on the side of an image corresponding to the middle of the eye width is 38.9 mm distant from the optical axis, and therefore the rays cannot be sufficiently introduced into the pupil. As described above, the diameter of the pupil is about 3 mm in the dark and 8 mm in the light. Therefore, according to the conventional optical system for magnifying a display panel, it is very distorted when viewed at an angle with respect to the optical axis.

(EXAMPLE 1)

Figure 7:
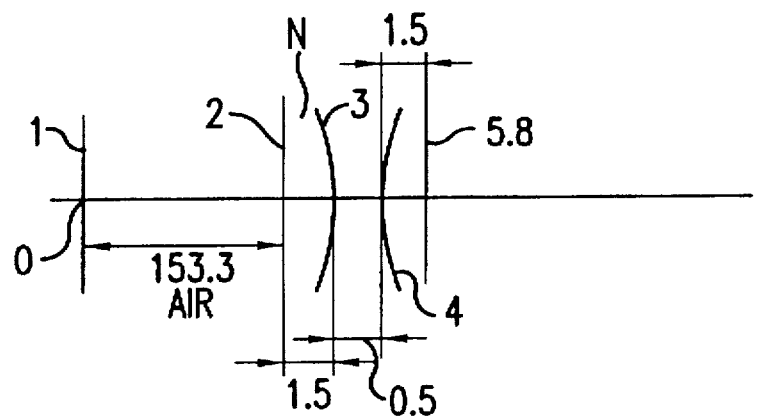
FIG. 7 is a schematically enlarged view of an optical system relative to Table 2.

Design data of the optical system as shown in FIG. 1 according to Example 1 are shown in Table 2. FIG. 7 is a diagrammatic view showing an optical system based on the design data in Table 2. In this example, each of two Fresnel lenses is made of plano-convex lens and it is intended that the symmetry of the lenses is improved in order to lessen a coma out of the axis. Further, two convex surfaces opposite each other are both aspherical so as to lessen a spherical aberration and a transverse aberration out of the axis. Table 6 shows a result of ray tracing according to Table 2. Table 6 obviously teaches that corrections to a longitudinal spherical aberration SA and a transverse spherical aberration DY are harder in comparison with the prior art, whereas correction to a transverse aberration is easier since the aberration D-DY is less than 3 mm. The power of the Fresnel lens 2 on the side close to the surface of an instrument is obviously a little larger than that of the Fresnel lens 3 since a radius of curvature of a surface 3 is larger than that of a surface 4. However, by equalizing the power of the Fresnel lens 2 with that of the Fresnel lens 3, the correction to the transverse aberration out of the axis is carried out better. The aspherical surface of the Fresnel lens 2 is an ellipse with a major axis in the direction of the optical axis and Fresnel lens 3 has a hyperboloid surface similar to a parabola. For an improvement of the correction to the transverse aberration out of the axis, the surfaces 3, 4 may be made an aspherical surface with a high power coefficient.

Although aspherical Fresnel lenses having the same optical characteristics were opposed to each other for ray tracing, the transverse aberration out of the axis was not able to be lessened below 3 mm.

(EXAMPLE 2)

Figure 8:
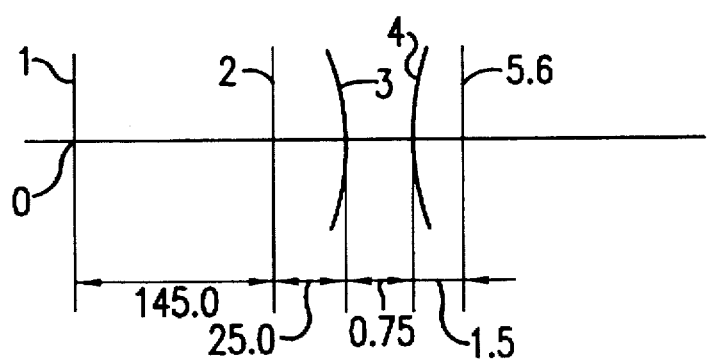
FIG. 8 is a schematically enlarged view of an optical system relative to Table 3.

Design data of an optical system according to Example 2 are shown in Table 3. FIG. 8 is a diagrammatic view showing an optical system based on the design data in Table 3. In this example, a lens on the side close to the surface of an instrument is a spherical lens (since it is very hard to process it into an aspherical lens) and another is a Fresnel lens. A surface 4 is made to have a hyperbolic curve close in aspherical coefficient to a parabola.

Table 7 shows a result of the ray tracing in this example.

Corrections to a longitudinal spherical aberration SA and a transverse spherical aberration DY are harder in comparison with that of the prior art, whereas a transverse aberration D-DY is less than 3 mm as Table 7 teaches.

As described in Examples 1, in the case of a transverse aberration below 3 mm at the point of the eyes, an instrument can be preferably viewed without any distortion even if it is viewed at an angle with respect to the optical axis in the light.

Figure 9:
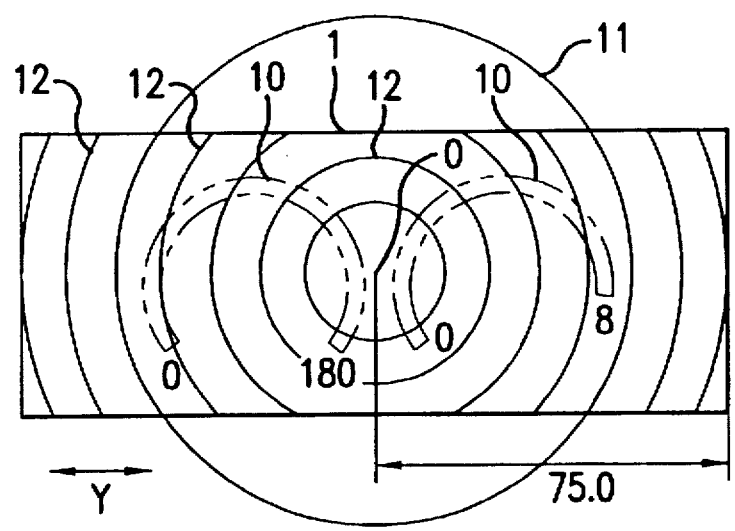
FIG. 9 is a top view of a magnifying lens according to the present invention.

FIG. 9 is a front view of the optical system for magnifying a display panel. Referring to FIG. 9, phantom line 10 shows scale markings of two instruments. The two instruments can be viewed without any distortion wherever the eyes are positioned within a circle 11 with radius 55 mm. Reference numeral 12 shows the borderline of the Fresnel lens 3 a pitch of which is 0.3 mm as described above. Reference character O' shows the center of a vortex of the lens 3 which coincides with the axis O (see FIG. 10).

A double-convex lens or a meniscus lens may be used. Further, each of the two lenses may be a spherical lens.

By adopting two choices of selecting the division of a power and selecting the second aspherical surface, the transverse aberration out of the axis is made less than 3 mm, and therefore the correction to the spherical aberration can be improved.

Tables according to the present invention are shown in the following.

TABLE 1

| NO | RADIUS | D | ND | NG | NC | NF |
|----|--------|------|------|------|------|------|
| 1 | PLANE | 153.3000 | AIR | | | |
| 2 | PLANE | 1.5000 | 1.49430 | 1.50190 | 1.48900 | 1.49750 |
| 3 | −150.8300 | 0.0000 | AIR | | | |
| 4 | PLANE | 0.0000 | AIR | | | |

| NO | K | A4 | A6 | A8 | A10 |
|----|---|----|----|----|-----|
| 3 | −3.50000E + 00 | 0.00000E + 00 | 0.00000E + 00 | 0.00000E + 00 | 0.00000E + 00 |

F = 305.139 BF = 305.139 O1 = 154.304 OK = 0

TABLE 2

| NO | RADIUS | D | ND | NG | NC | NF |
|----|--------|------|------|------|------|------|
| 1 | PLANE | 153.3000 | AIR | | | |
| 2 | PLANE | 1.5000 | 1.49430 | 1.50190 | 1.48900 | 1.49750 |
| 3 | −271.1600 | 0.5000 | AIR | | | |
| 4 | 339.1400 | 1.5000 | 1.49430 | 1.50190 | 1.48900 | 1.49750 |
| 5 | PLANE | 0.0000 | AIR | | | |
| 6 | PLANE | 0.0000 | AIR | | | |

| NO | K | A4 | A6 | A8 | A10 |
|----|---|----|----|----|-----|
| 3 | 7.50000E − 01 | 0.00000E + 00 | 0.00000E + 00 | 0.00000E + 00 | 0.00000E + 00 |
| 4 | −1.70000E + 00 | 0.00000E + 00 | 0.00000E + 00 | 0.00000E + 00 | 0.00000E + 00 |

F = 304.963 BF = 303.681 O1 = 154.226 OK = −1.28177

TABLE 3

| NO | RADIUS | D | ND | NG | NC | NF |
|---|---|---|---|---|---|---|
| 1 | PLANE | 145.0000 | AIR | | | |
| 2 | PLANE | 25.000 | 1.49430 | 1.50190 | 1.48900 | 1.49750 |
| 3 | −284.0000 | 0.7500 | AIR | | | |
| 4 | 321.0000 | 1.5000 | 1.49430 | 1.50190 | 1.48900 | 1.49750 |
| 5 | PLANE | 0.0000 | AIR | | | |
| 6 | PLANE | 0.0000 | AIR | | | |

| NO | K | A4 | A6 | A8 | A10 |
|---|---|---|---|---|---|
| 4 | −1.04000E + 00 | 0.00000E + 00 | 0.00000E + 00 | 0.00000E + 00 | 0.00000E + 00 |

F = 305.031  BF = 303.629  O1 = 162.083  OK = −1.40198

TABLE 4

| Y | YM | YO | YU |
|---|---|---|---|
| 10.00 | −38.900000 | 0.0000 | 79.0000 | −79.0000 |
| 7.00 | −27.506200 | 0.0000 | 79.0000 | −79.0000 |
| 5.00 | −19.449600 | 0.0000 | 79.0000 | −79.0000 |
| 0.00 | 0.000000 | 0.0000 | 79.0000 | 0.0000 |

TABLE 5

| | Y | Y | Y |
|---|---|---|---|
| | 55.105 | 39.032 | 27.623 |
| DY | SA | D-DY | D-DY | D-DY |
| 10 −0.3432 | −2.250 | 10  9.8736 | 10  7.0626 | 10  5.0018 |
| 9 −0.2282 | −1.663 | 7  4.9858 | 7  3.5544 | 7  2.5063 |
| 7 −0.0841 | −0.782 | 0  0.0000 | 0  0.0000 | 0  0.0000 |
| 5 −0.0260 | −0.342 | −7  5.4374 | −7  1.3979 | −7  2.7599 |
| 0  0.0000 | 0.000 | −10 11.9674 | −10 2.9172 | −10 6.0347 |

TABLE 6

| | Y | Y | Y |
|---|---|---|---|
| | 54.821 | 38.911 | 27.566 |
| DY | SA | D-DY | D-DY | D-DY |
| 10 0.8490 | 5.620 | 10 −2.1168 | 10 −0.7321 | 10 −0.0115 |
| 9 0.9422 | 6.943 | 7 −1.1988 | 7 −0.2765 | 7  0.2107 |
| 7 0.6995 | 6.557 | 0  0.0000 | 0  0.0000 | 0  0.0000 |
| 5 0.3135 | 4.142 | −7  1.3718 | −7  0.4437 | −7 −0.1872 |
| 0 0.0000 | 0.000 | −10  1.7150 | −10  0.3917 | −10 −0.3404 |

TABLE 7

| | Y | Y | Y |
|---|---|---|---|
| | 52.929 | 37.563 | 26.609 |
| DY | SA | D-DY | D-DY | D-DY |
| 10 1.0732 | 7.062 | 10 −0.2127 | 10  0.5920 | 10  0.9544 |
| 9 1.0119 | 7.362 | 7 −0.3814 | 7  0.2465 | 7  0.5353 |
| 7 0.6766 | 6.202 | 0  0.0000 | 0  0.0000 | 0  0.0000 |
| 5 0.2962 | 3.801 | −7  1.6464 | −7  0.5061 | −7  0.0323 |
| 0 0.0000 | 0.000 | −10  2.3815 | −10 −0.5812 | −10  0.0137 |

Figure 10:
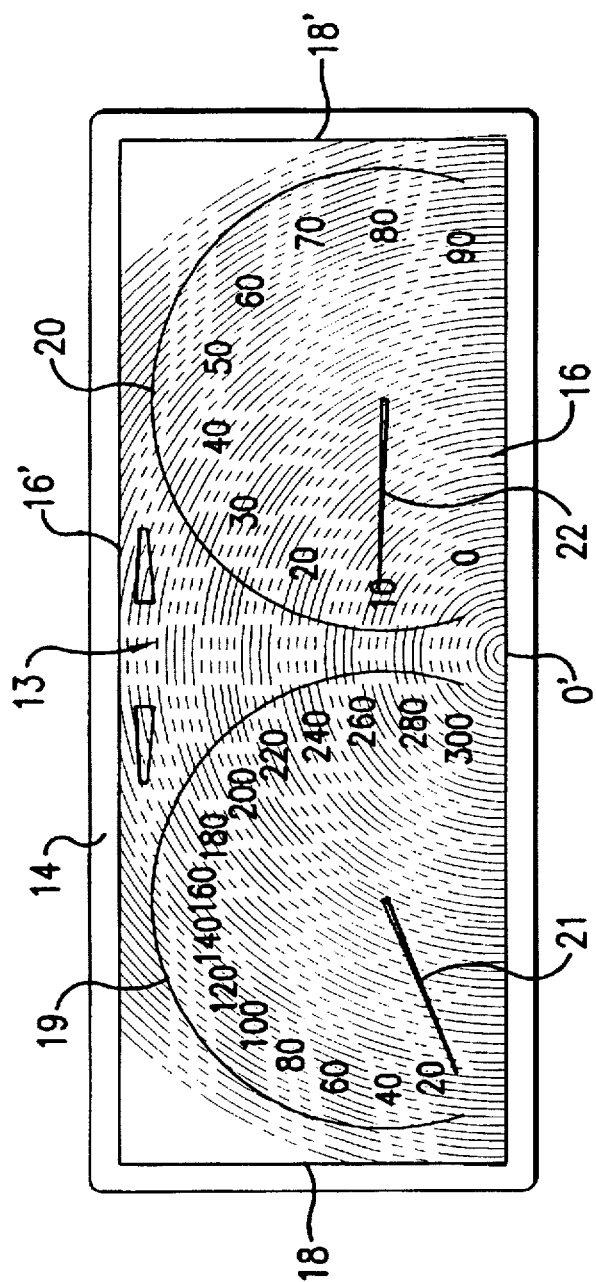
FIG. 10 is a top view of a first variant of a Fresnel lens as a lens for magnifying a display panel according to the present invention.
Figure 11:
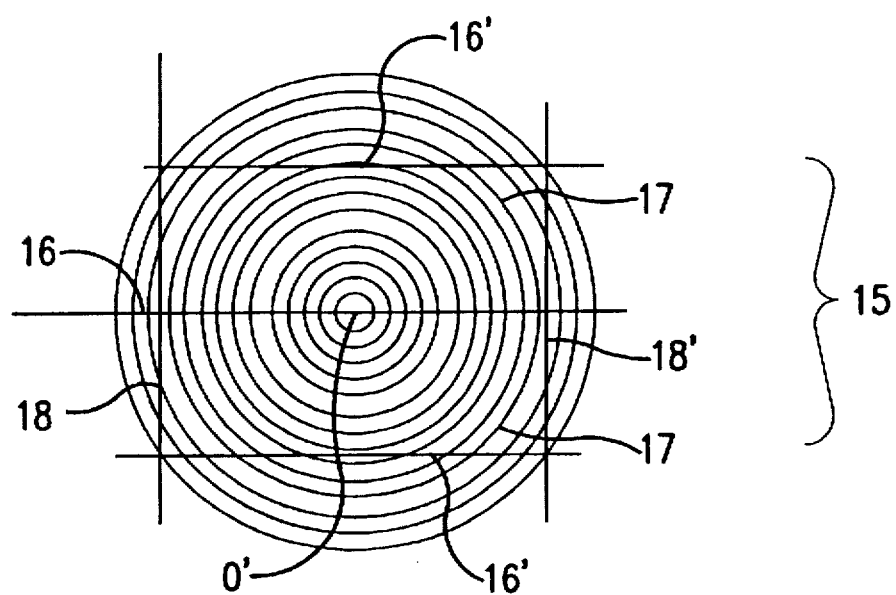
FIG. 11 is a view showing an example of a method for making the Fresnel lens of FIG. 10.

FIG. 10 is a plan view showing a first variant of a Fresnel lens as a lens 1 for magnifying a display panel according to the invention. Reference numeral 13 designates a rectangular Fresnel lens. When the vortex center O' coincides with the center of the rectangular Fresnel lens as shown in FIG. 9 and a display panel is viewed through the Fresnel lens, the much prominent vortex center O' often gives an uncomfortable feeling to viewers. On the other hand, when the vortex center O' of the Fresnel lens 13 is located at the middle of any side of the lens 13 as shown in FIG. 10, the vortex center O' becomes inconspicuous. Reference numeral 14 designates a housing frame. The rectangular Fresnel lens 13 is produced as follows. For example, as shown in FIG. 11, a circular untreated plate for a Fresnel lens is formed by injection resin molding or thermo-press working; the untreated plate 15 is cut in two along the straight line 16 passing through the vortex center O' to form two untreated plates 17, 17; and the two semicircular untreated plates 17, 17 are each cut along lines 16', 16' parallel to the central line 16 and then each plate 17 is cut along two parallel lines 18, 18' perpendicular to the sides 16, 16', respectively, so that two Fresnel lenses one of which is shown in FIG. 10 are made out of the one untreated plate 15. Since two rectangular Fresnel lenses are made out of an untreated plate 15 as mentioned above, the yield of a Fresnel lens is improved, and therefore the cost thereof can be reduced. The vortex center O' of the Fresnel lens 13 may be located outside the lens 13 in place of locating it at the center of any of the four sides 16, 16', 18, and 18', as shown in FIG. 10. Referring to FIG. 10, reference numerals 19, 20, 21, and 22 designate a display panel of a speedometer indicating speed of a automobile, a display panel of a tachometer indicating the revolutions of a revolving shaft, a indicator needle of the speedometer, a indicator needle of the tachometer, respectively.

Two rectangular Fresnel lenses 13 may be produced out of a rectangular untreated lens plate in place of a circular untreated lens plate as shown in the first variant.

Figure 12:
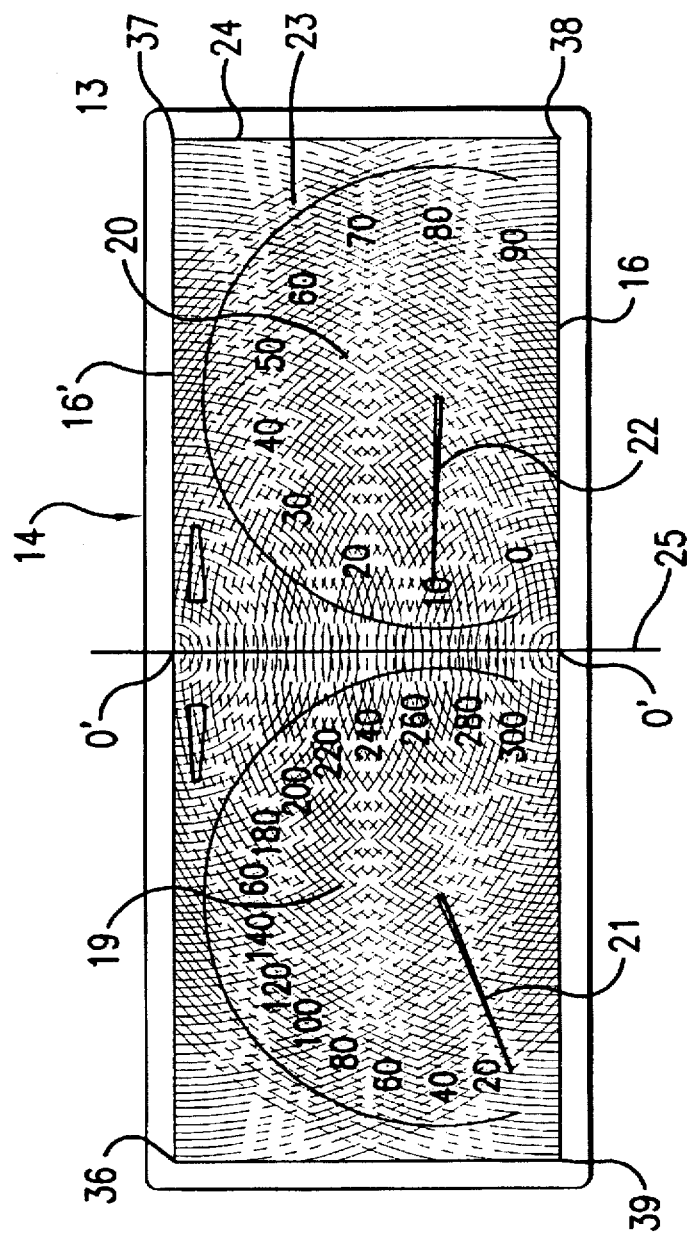
FIG. 12 is a top view of a second variant of a Fresnel lens as a lens for magnifying a display panel according to the present invention.

FIG. 12 is a plan view showing a second variant of a Fresnel lens as a lens 1 for magnifying a display panel. In the second variant, the magnifying lens 1 is constructed with two laminated Fresnel lenses as mentioned in the first variant. One vortex center O' of the Fresnel lenses is located at the middle of a side 16 and the other O' at the middle of a side 16' parallel to the side 16. When the two Fresnel lenses are located in such a manner, concentric circles 23, 24 of the Fresnel lenses intersect each other as if curved in the opposite direction. Patterns formed by the concentric circles 23, 24 are almost symmetrical with respect to a line 25.

By the arrangement of the vortex centers of the two Fresnel lenses in such a way as shown in FIG. 12, the vortex centers become unnoticed the same as in the first variant.

Further, an optical distortion of the Fresnel lens 13 is decreased. Further, moire or undesirable patterns are avoidable which are caused by a slight disagreement of the two vortex centers O', O' of the Fresnel lenses each having the vortex center at the center of the rectangular in superimposing the one upon the other. Further, a halation or an undesirable reflection of light is avoidable which is caused by the repetition of reflection of light around the two vortex centers. Further, a slant of the optical axis caused by a prism effect (whereby an optical axis is refracted since there is used an upper or lower half of a lens either of which is cut with respect to the optical axis and whose cross section has the same shape as a wedge prism) can be corrected since the prism effect of the one Fresnel lens 13 is compensated by that of the other Fresnel lens 13.

Two Fresnel lenses 13 each of which has its vortex center outside the edge thereof may be superimposed upon each other as mentioned in the first variant in place of two Fresnel lenses each having its vortex center at the edge.

Figure 13:
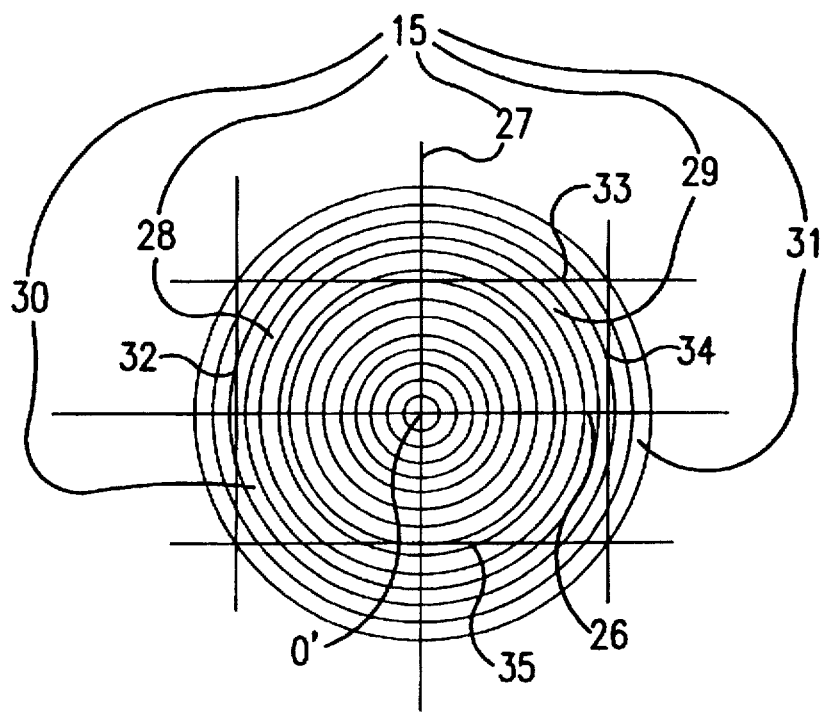
FIG. 13 is a view showing another example of a method for making the Fresnel lens.

Further, a display panel may be viewed with a magnifying lens constructed in such a manner that ,as shown in FIG. 13, a circular untreated lens plate 15 for Fresnel lenses is cut in four along lines 26, 27 each passing through the vortex center O' thereof, four quarter-circles 28 to 31 are cut along lines 32 to 35 to form four rectangular Fresnel lenses, and the four Fresnel lenses are superimposed upon each other so as to locate each vortex center O' at different corners 36 to 39 of the frame in FIG. 12 without coincidence of the vortex centers with each other.

Figure 14:
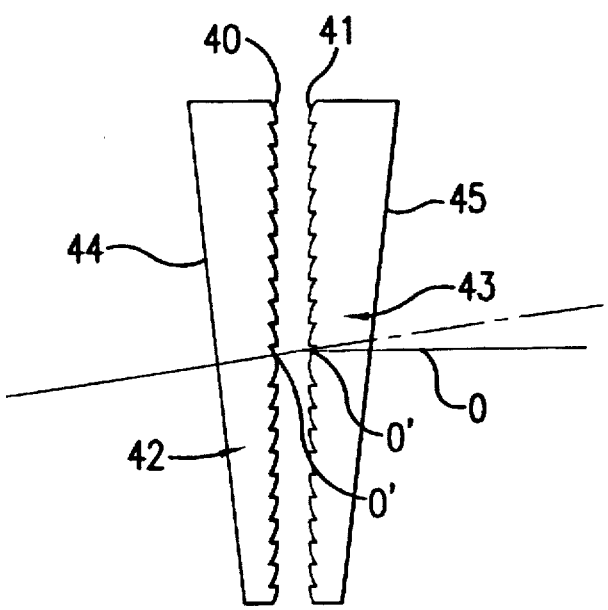
FIG. 14 is a view of a third variant of a lens for magnifying a display panel according to the present invention.

FIG. 14 is a view showing a third variant of a magnifying lens 1 according to the invention. In this variant, the lens 1 is constructed with a pair of prism lenses 42, 43 respectively having Fresnel lenses surface 40, 41 at one side of the lens. The Fresnel lens surfaces 40, 41 are opposed to each other. The prism lenses 42, 43 refract the optical axis O of a display panel by a given angle due to the prism effect. By using the prism lenses 42, 43, the range of choice of the arrangement of instruments or meters mounted on the dashboard instrument panel is expanded. Instead of the Fresnel lens surfaces 40, 41 opposite each other in this variant, the Fresnel lens surfaces 40, 41 may be formed at the other sides 44, 45, respectively, for example. Further, in stead of forming the prism and the Fresnel lens at the sides of the same lens in this variant, the prism lenses 42, 43 may be constructed such that the prism lens and the Fresnel lens are each made out of different untreated lenses and then they are laminated.

Figure 15:
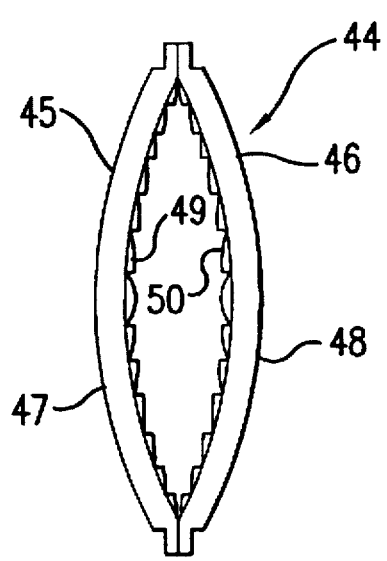
FIG. 15 is a view of a fourth variant of a lens for magnifying a display panel according to the present invention.

FIG. 15 is a view showing a fourth variant of a magnifying lens 1 according to the invention. In this variant, a laminated Fresnel lens 44 as a magnifying lens 1 is used. The Fresnel lens 44 is constructed with two Fresnel lens plates 45, 46 whose convex surfaces 47, 48 are both directed outward. In FIG. 15, each Fresnel lens plate 45, 46 is an aspherical lens having a curvature longitudinally and no curvature transversely. However, the laminated lens 44 may be constructed with spherical Fresnel lens plates. Fresnel lens surfaces 49, 50 each serving as a convex lens are formed on the concave surfaces of the lens plates 45, 46, respectively. The laminated lens 44 can magnify the display panel without increasing the refractive indices of the Fresnel lens surfaces 49, 50 or regardless of small refractive indices thereof since the convex surfaces 47, 48 each have a lens effect. Therefore, the display panel can be magnified almost without any distortion or aberration.

In stead of forming Fresnel lens surfaces 49, 50 each serving as a convex lens on the concave surfaces of the Fresnel lens plates 45, 46, Fresnel lens surfaces each serving as a concave lens may be formed on the convex surfaces 47, 48 of the Fresnel lens plates 45, 46 and laminate the two lens plates 45, 46 to make a laminated lens serving as a concave lens in such a manner that the convex surfaces 47, 48 are both directed outward. Since the Fresnel lens surface as a concave lens formed on the convex surfaces of the two Fresnel lens plates and the concave surface without a Fresnel lens surface produce a synergetic effect, such laminated lens can serve well as a concave lens even if the refractive index of each Fresnel lens plate is small.

Figure 16:
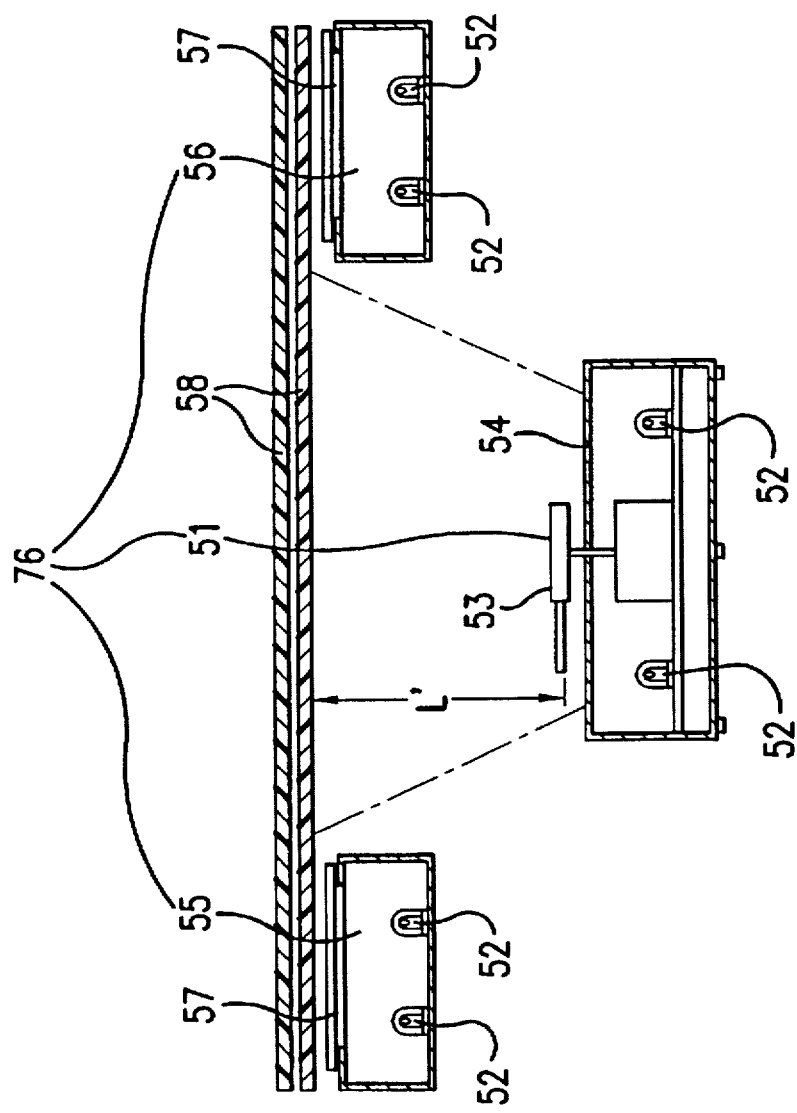
FIG. 16 is a view showing an apparatus for magnifying a display panel according to a first embodiment of the invention.

FIG. 16 is a view showing a magnifying apparatus provided with a magnifying lens according to a first embodiment of the invention. Reference numeral 51 designates a main instrument indicating speed of an automobile, the revolutions of a revolving shaft, or the like. The main instrument is illuminated by illuminating light sources 52 as if an indicator needle 53 and a dial 54 mounted on the instrument are self-luminous. Referent numerals 55, 56 designate a sub-instrument indicating liquid temperature, for example, and a sub-instrument indicating a quantity of the remains of fuel, respectively. The display panels 57, 57 of the sub-instruments are illuminated by the light sources 52 the same as the main instrument. Reference numeral 58 designates a wide Fresnel lens disposed over a multi-instrument 76 including the main instrument 51 and the sub-instruments 55, 56. As a Fresnel lens 58, a two-laminated Fresnel lens, for example, is used as described in the second variant. However, a single Fresnel lens or a known Fresnel lens may be used. The main instrument 51 is disposed distant by a distance L' from the Fresnel lens 58 under the middle portion of the lens 58, whereas the sub-instruments 55, 56 are disposed close to the Fresnel lens 58 under the edge portions of the lens 58.

Therefore, when the display panel of the instrument 51 to be viewed distantly is viewed through the Fresnel lens 58, the dial as a display panel is magnified since the virtual image of the dial is formed more distant than L' owing to a distance L' between the lens 58 and the display panel. On the other side, the sub-instruments 55, 56 are hardly magnified since they are disposed close to the back of the Fresnel lens 58, and therefore the images of the sub-instruments 55, 56 are hardly distorted even if the lens has an aberration at the edge.

FIGS. 17, 18 are views showing a display panel magnifying apparatus according to a second embodiment of the invention. Referring to FIGS. 17, 18, a movement 60 is fixed to a central inside portion of a housing 59 by fastenings 61, and screws 62. Connection terminals 63 of the movement 60 are soldered with a circuit of a printed board 64. A dial 65 for transmitted illumination is fixed to the edge of the opening of the housing 59 by screws 66. Scale markings 67 of the dial 65 transmit illumination light and the other portion of the dial 65 shades the same. Reference numeral 68 designates a light shading layer. The scale markings 67 are marked within the edge of the opening of the housing 59. As shown in FIG. 18, an annular fluorescent lamp as a light source is disposed inside the housing 59. The fluorescent lamp 69 is fixed to the housing 59 by not shown means. A lens 1 (including a Fresnel lens) according to the invention or a known Fresnel lens is disposed over the dial 65. Since the light source 69 is disposed within the edge of the opening of the housing 59 in the second embodiment as mentioned above, the whole instrument can be constructed smaller than before and further all the display panels for transmitted illumination can be illuminated efficiently.

In the second embodiment, the same reference numerals are given to the same components as those of the prior art in FIG. 21.

In stead of one fluorescent lamp as a light source in the second embodiment, a plural number of small electric lamps may be used.

What is claimed is:

1. An optical system for magnifying a display panel comprising:

two Fresnel lens plates for magnification disposed in front of said display panel for viewing said display panel with both eyes of a viewer, wherein said two Fresnel lens plates each have a plurality of vortical circular stripes, and a center of the circular stripes is concentric, said two Fresnel lens plates being superimposed on each other, a center of the circular stripes of one of said two Fresnel lens plates being located on an upper edge of said one of said two Fresnel lens plates or outside and in proximity of the upper edge thereof whereas a center of the circular stripes of the other Fresnel lens plate is located on a lower edge of said other Fresnel lens plate or outside and in proximity of the lower edge thereof, the circular stripes of skid two Fresnel lens plates optically intersect each other.

2. An optical system for magnifying a display panel according to claim 1, wherein at least one of said Fresnel lens plates itself has a longitudinal section shaped like a prism, a Fresnel lens surface is formed on one surface of said at least one of said Fresnel lens plates, and said at least one of said Fresnel lens plates serves as a prism.

3. An optical system for magnifying a display panel according to claim 1, further comprising a first instrument and a second instrument, said first instrument being disposed in a center of and distant from said display panel, said second instrument being disposed on an edge of and close to said display panel.

4. An optical system for magnifying a display panel according to claim 1, wherein said first and second instruments each have a housing including a movement and a dial plate fixed to an opening of said housing, scale markings marked inside said opening are formed in said dial plate, and said opening is illuminated with light from a light source disposed around said movement inside said housing.

5. An optical system for magnifying a display panel, including a convex lens disposed in front of said display panel for magnifying and viewing said display panel with both eyes of a viewer, wherein said convex lens is formed by allowing two curved Fresnel lens plates to face each other and be superimposed on each other such that convex surfaces of said Fresnel lens plates are directed outward whereas concave surfaces thereof are directed inward;

Fresnel lens surfaces having convex power are respectively formed on the concave surfaces of said Fresnel lens plates;

said Fresnel lens plates each having a plurality of vortical circular stripes; and a center of the circular stripes is concentric and is located on an edge of or outside said Fresnel lens plates.

6. An optical system for magnifying a display panel, including a concave lens disposed in front of said display panel for magnifying and viewing said display panel with both eyes of a viewer, wherein said concave lens is formed by allowing two curved Fresnel lens plates to face each other and be superimposed on each other such that concave surfaces of said Fresnel lens plates are directed outward whereas convex surfaces thereof are directed inward;

Fresnel lens surfaces having concave power are respectively formed on the convex surfaces of said Fresnel lens plates;

said Fresnel lens plates each have plenty of vortical circular stripes; and a center of the circular stripes is concentric and is located on an edge of or outside said Fresnel lens plates.

* * * * *